United States Patent [19]
Howell et al.

[11] Patent Number: 6,128,192
[45] Date of Patent: Oct. 3, 2000

[54] INTEGRATED REAR COVER FOR A NOTEBOOK COMPUTER BASE

[75] Inventors: Bryan Howell; Mark A. Penniman, both of Austin, Tex.

[73] Assignee: Dell USA, L.P., Round Rock, Tex.

[21] Appl. No.: 09/067,622

[22] Filed: Apr. 28, 1998

[51] Int. Cl.[7] .................................................... G06F 1/16
[52] U.S. Cl. .................... 361/724; 361/725; 361/726; 361/727; 312/223.2; 312/223.3
[58] Field of Search ........................... 361/683, 724–727; 312/223.2–223.6

[56] References Cited

U.S. PATENT DOCUMENTS

| | | | |
|---|---|---|---|
| 5,294,994 | 3/1994 | Robinson et al. | 361/683 |
| 5,392,192 | 2/1995 | Dunn et al. | 361/727 |
| 5,918,957 | 7/1999 | Bovio et al. | 312/223.2 |
| 6,023,415 | 2/2000 | Mayer et al. | 361/727 |
| 6,058,016 | 5/2000 | Anderson et al. | 361/685 |

*Primary Examiner*—Leo P. Picard
*Assistant Examiner*—Hung Van Duong
*Attorney, Agent, or Firm*—Haynes and Boone, LLP

[57] ABSTRACT

A portable computer housing includes a base having a top member and a bottom member clamped together and reinforced by a one-piece end cover member. Peripheral edge portions of the end cover member engage peripheral edge portions of the top member and bottom member. The top member includes a first flange on opposite ends thereof and the bottom member includes a second flange on opposite ends thereof. The first and second flanges form interrupted base end flanges when the top and bottom members are clamped together. The end cover member includes a cover end flange at opposite ends thereof. Each cover end flange overlappingly engages the base end flanges at each opposite end of the base.

20 Claims, 5 Drawing Sheets

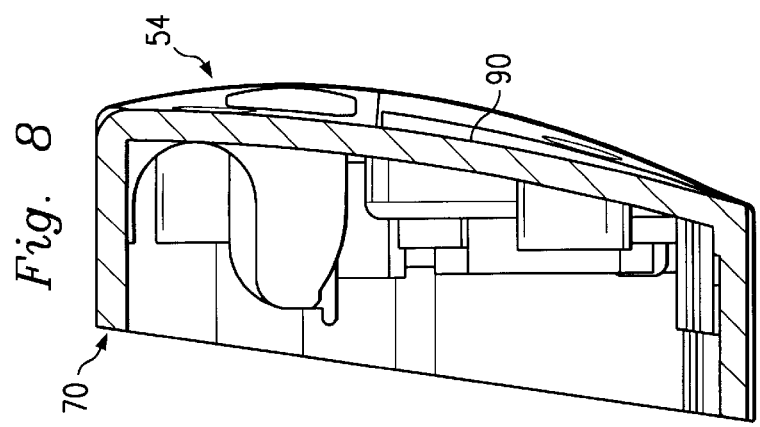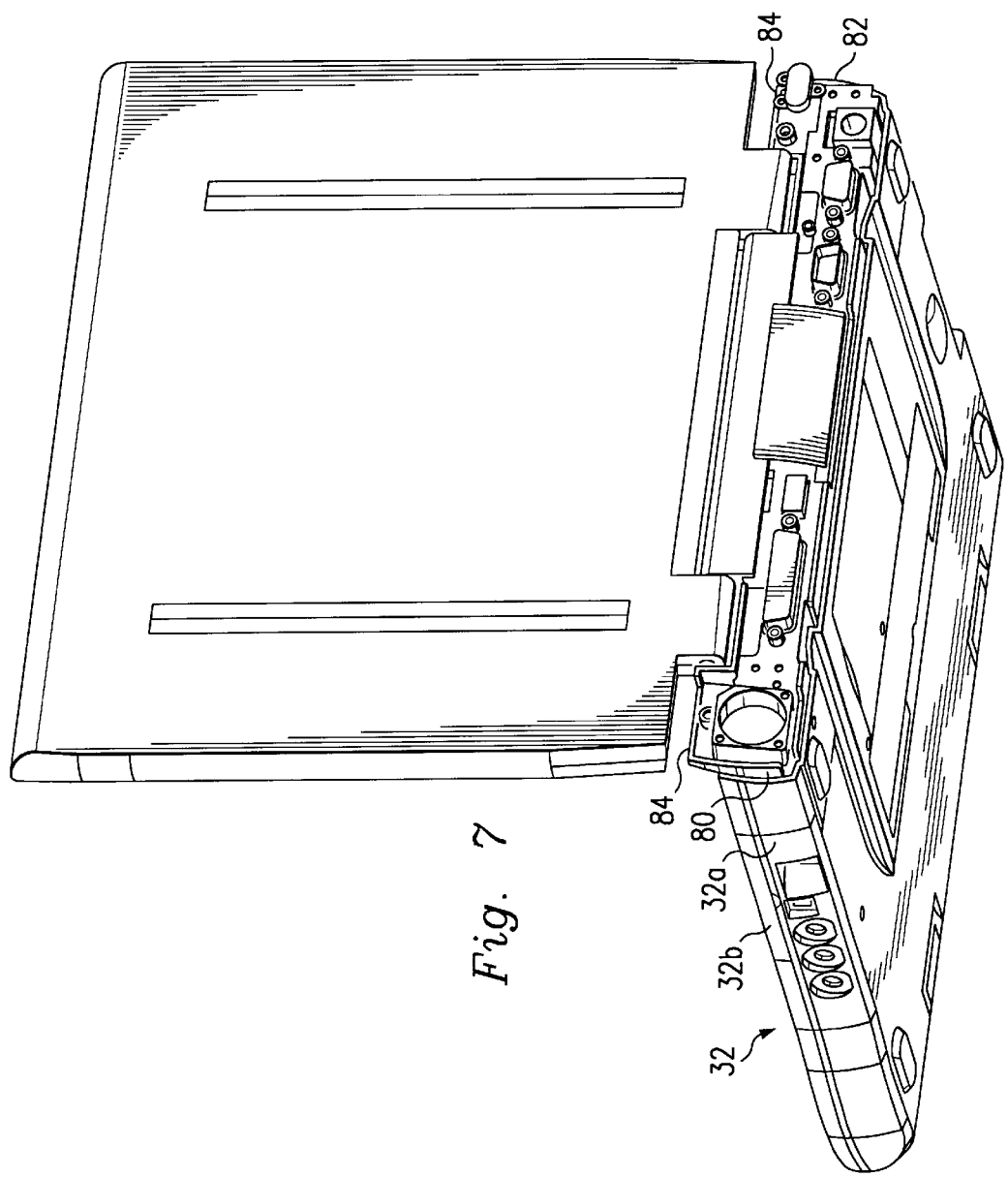

INTEGRATED REAR COVER FOR A NOTEBOOK COMPUTER BASE

BACKGROUND

The disclosures herein relate generally to portable computers and more particularly to a structural rear cover for attachment to the base of a notebook computer.

Traditional notebook computers have a plastic clam shell type base to house the motherboard and various peripherals. The base is also a support for the movable LCD pivotably attached thereto. Typically, the base is formed by a top member and a bottom member. The bottom member supports the motherboard, LCD clutches, fans, a CD floppy module, a hard drive bay, a battery bay, a hybrid cooler and other components. The top member covers the components in the bottom member and also provides a frame for the keyboard and includes a palm rest surface adjacent the keyboard. Each of the top and bottom members have a partial end wall. When the top and bottom members are assembled together to house the components mentioned above, the two partial end walls come together to form a housing end wall wherein the input-output ports are provided.

Typically, this clam shell type of construction is structurally weak in certain areas. One such area is the end wall which is immediately adjacent the hinge support for the LCD attachment. Thus, when access to the components is desired, the LCD must be removed and the top and bottom clam shell members must be separated. This involves considerable disassembly and substantial time. Also, when notebook computers are dropped, components and parts of the plastic housing are often broken. If damage occurs to the end wall of the base, usually both the top and bottom portions of the base require replacement.

Therefore, what is needed is a housing construction which allows component access and/or housing repair and replacement without separating the top and bottom clam shell portions of the housing.

SUMMARY

One embodiment, accordingly, provides a unique portable computer housing construction which allows component access without separating the top and bottom clam shell base housing portions. To this end, a portable computer housing comprises a base including a first member and a second member. A one-piece end cover member has peripheral edge portions engaged with peripheral edge portions of the first member and the second member for clamping and reinforcing the first and second members together. The end cover member includes several input-output ports.

A principal advantage of this embodiment is that the one-piece end cover member allows versatility for the industrial design and for the manufacturing and service environment. In addition, the end cover member provides advantages in the mechanical construction architecture by providing structural enhancements and repair and replacement enhancements to the base housing portion of a portable computer.

BRIEF DESCRIPTION OF THE DRAWINGS

FIG. 7 is an isometric view illustrating an embodiment of the notebook computer of FIG. 5 with the end cover removed.

FIG. 8 is a cross-sectional side view illustrating an embodiment of the end cover.

DETAILED DESCRIPTION OF THE PREFERRED EMBODIMENT

Figure 1:
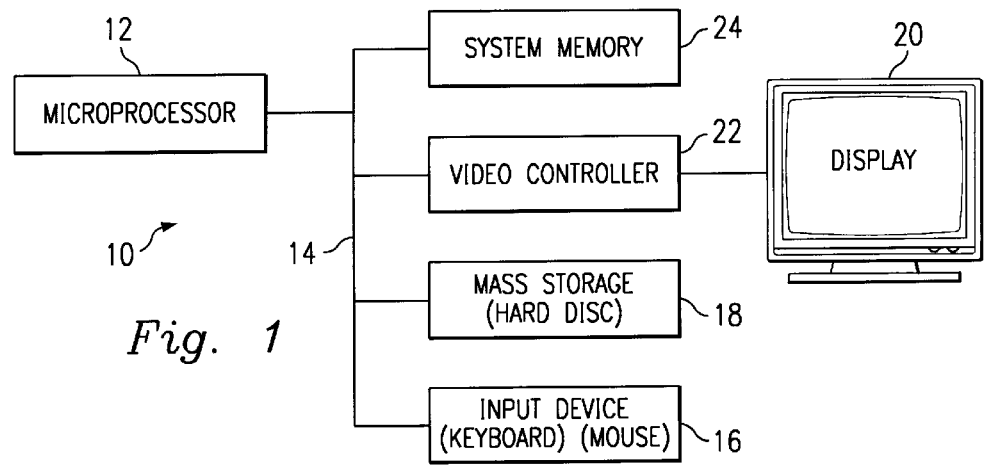
FIG. 1 is a diagrammatic view illustrating an embodiment of a typical computer system.

In one embodiment, computer system 10, FIG. 1, includes a microprocessor 12 which is connected to a bus 14. Bus 14 serves as a connection between microprocessor 12 and other components of computer system 10. An input device 16 is coupled to microprocessor 12 to provide input to microprocessor 12. Examples of input devices include keyboards, touchscreens, and pointing devices such as mouses, trackballs and trackpads. Programs and data are stored on a mass storage device 18, which is coupled to microprocessor 12. Mass storage devices include such devices as hard disks, optical disks, magneto-optical drives, floppy drives and the like. Computer system 10 further includes a display 20, which is coupled to microprocessor 10 by a video controller 22. A system memory 24 is coupled to microprocessor 12 to provide the microprocessor with fast storage to facilitate execution of computer programs by microprocessor 12. It should be understood that other busses and intermediate circuits can be deployed between the components described above and microprocessor 12 to facilitate interconnection between the components and the microprocessor.

Figure 2:
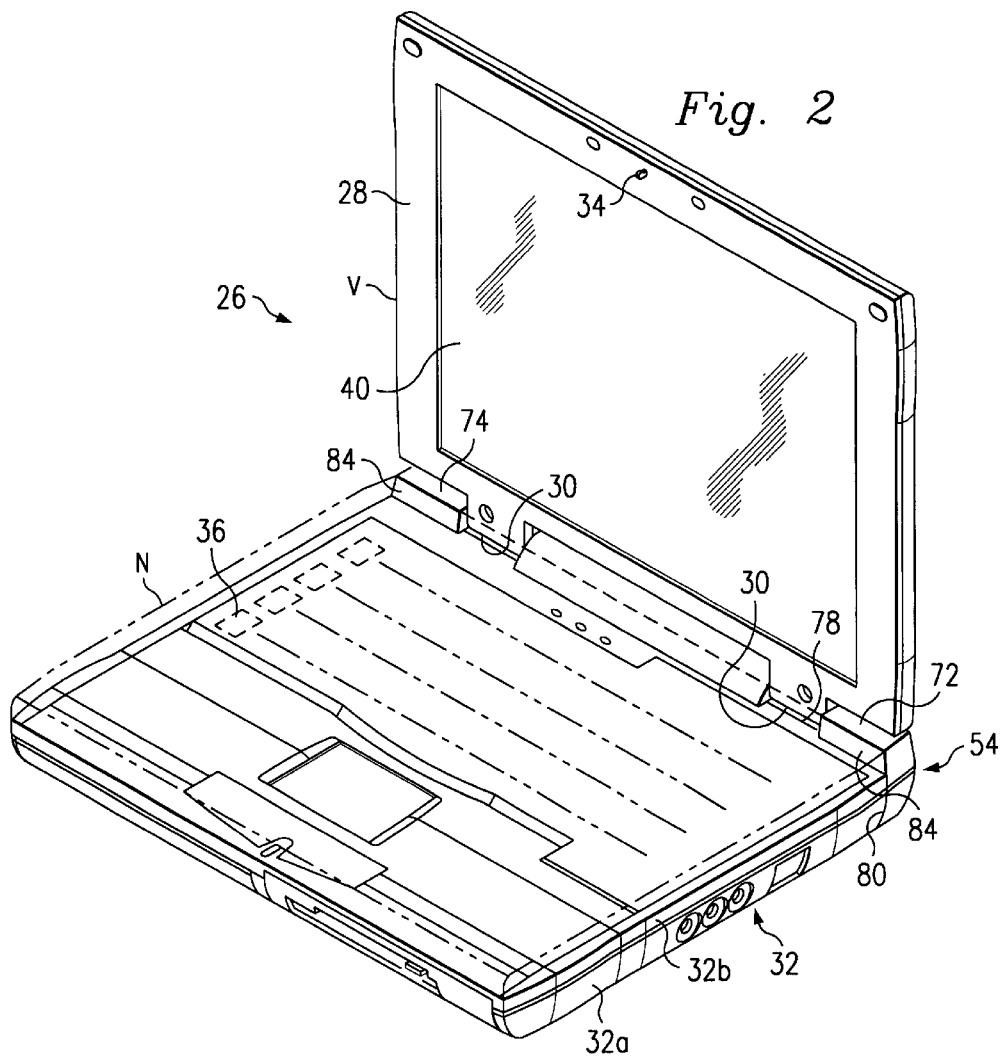
FIG. 2 is an isometric view illustrating an embodiment of a typical notebook computer.

Referring to FIGS. 1 and 2, illustrated is a portable, notebook size computer designated 26 comprising a self-contained system, such as that illustrated at 10 in FIG. 1, and including a hinged top or lid 28 rotatable about a hinge or hinges 30 from a nested position "N," FIG. 2, with a horizontal base 32, to a substantially vertical or open position "V". Opening of the notebook style portable computer by manipulation of a latch 34, reveals a plurality of keys 36 on base 32, and a monitor screen 40 mounted in lid or top 28. Base 32 includes a bottom or first member 32a and a top or second member 32b, each of which will be discussed below in greater detail.

Figure 3:
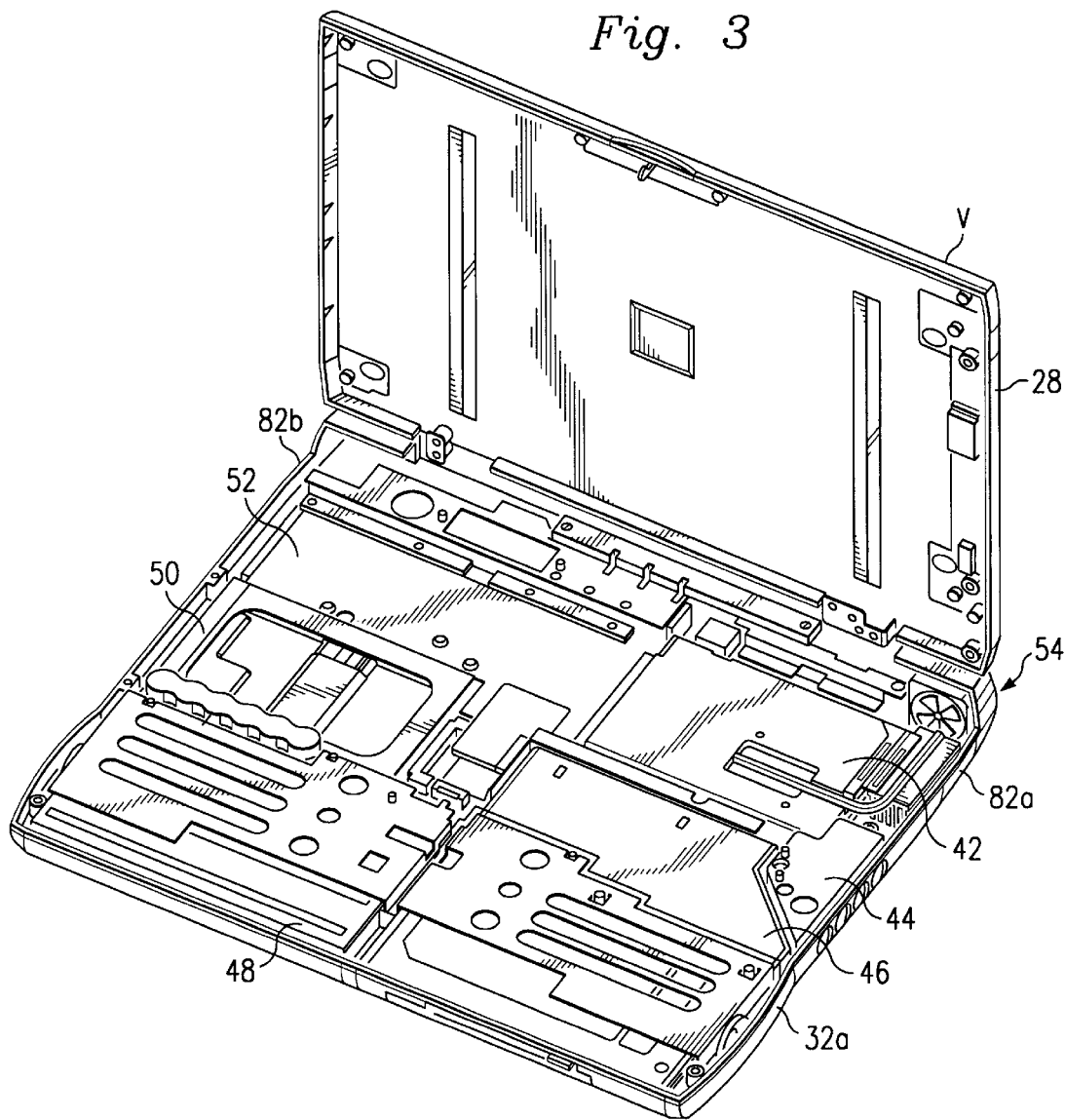
FIG. 3 is an isometric view illustrating an embodiment of a portion of a notebook computer with the keyboard and LCD removed and including an end cover member mounted on the base.

Computer 26, FIG. 3 illustrates the first member 32a of base 32 with the second or keyboard member 32b removed thus exposing some of the components mounted in base 32. Some of the components include a hybrid cooling section 42, an audio subsection 44, a CD floppy module section 46, a battery bay section 48, a hard-disk drive section 50 and a motherboard section 52. Top 28 is illustrated in the open position V and has the monitor screen 40 removed.

Figure 4:
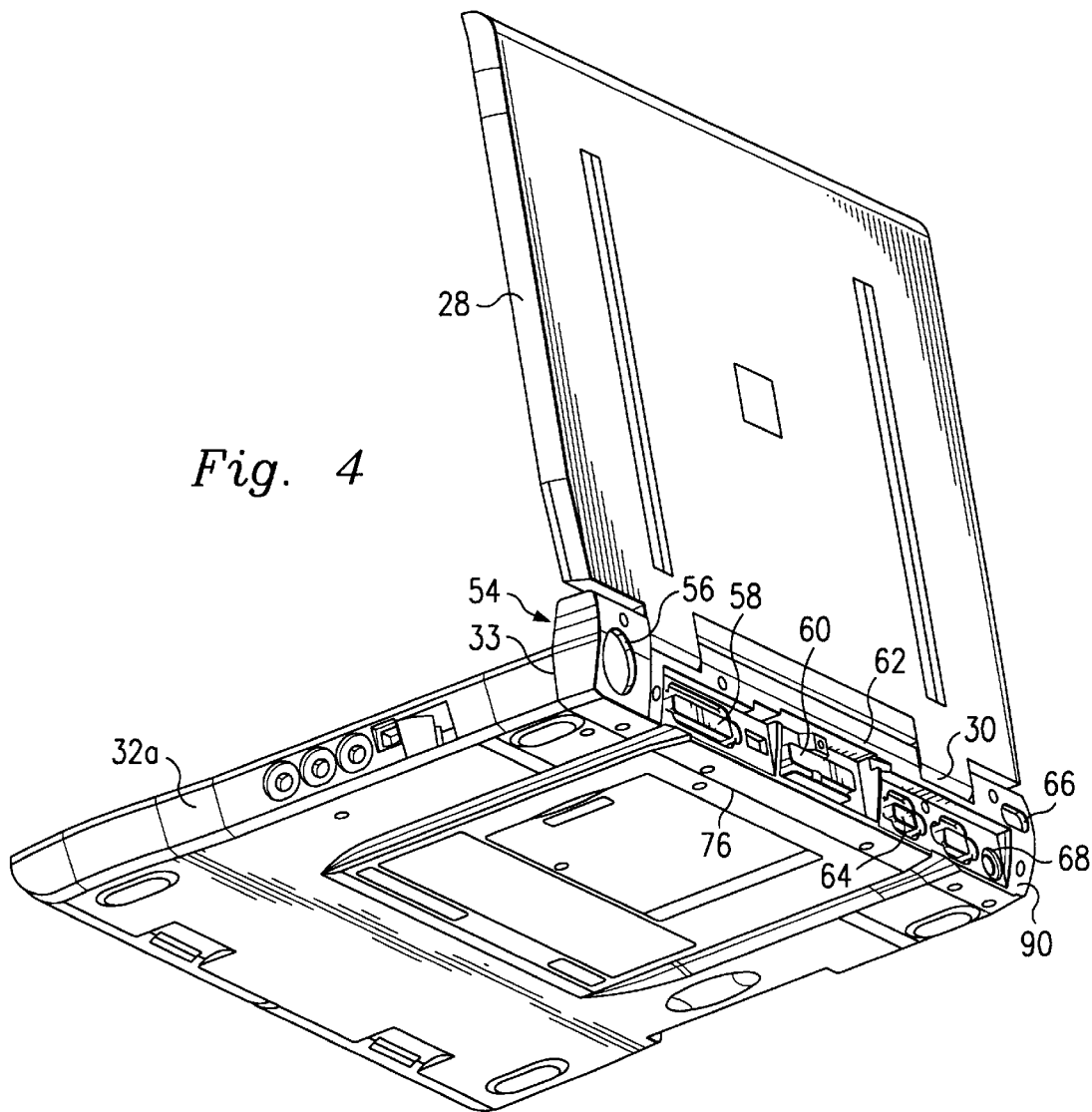
FIG. 4 is another isometric view illustrating the notebook computer of FIG. 3.

In FIG. 4, an end cover member 54 is illustrated and is mounted on a rear surface 33 of first member 32a of base 32 adjacent hinge 30 attaching top 28. End cover member 54 is formed as a one piece molded member and includes a fan port 56, an input-output (I/O) port 58, a docking port 60 including a movable door or cover 62 illustrated in an open position exposing docking port 60, another I/O port 64, an infrared IR lens port 66 and a PS 2 port 68 for connection to an external keyboard, not shown.

Figure 5:
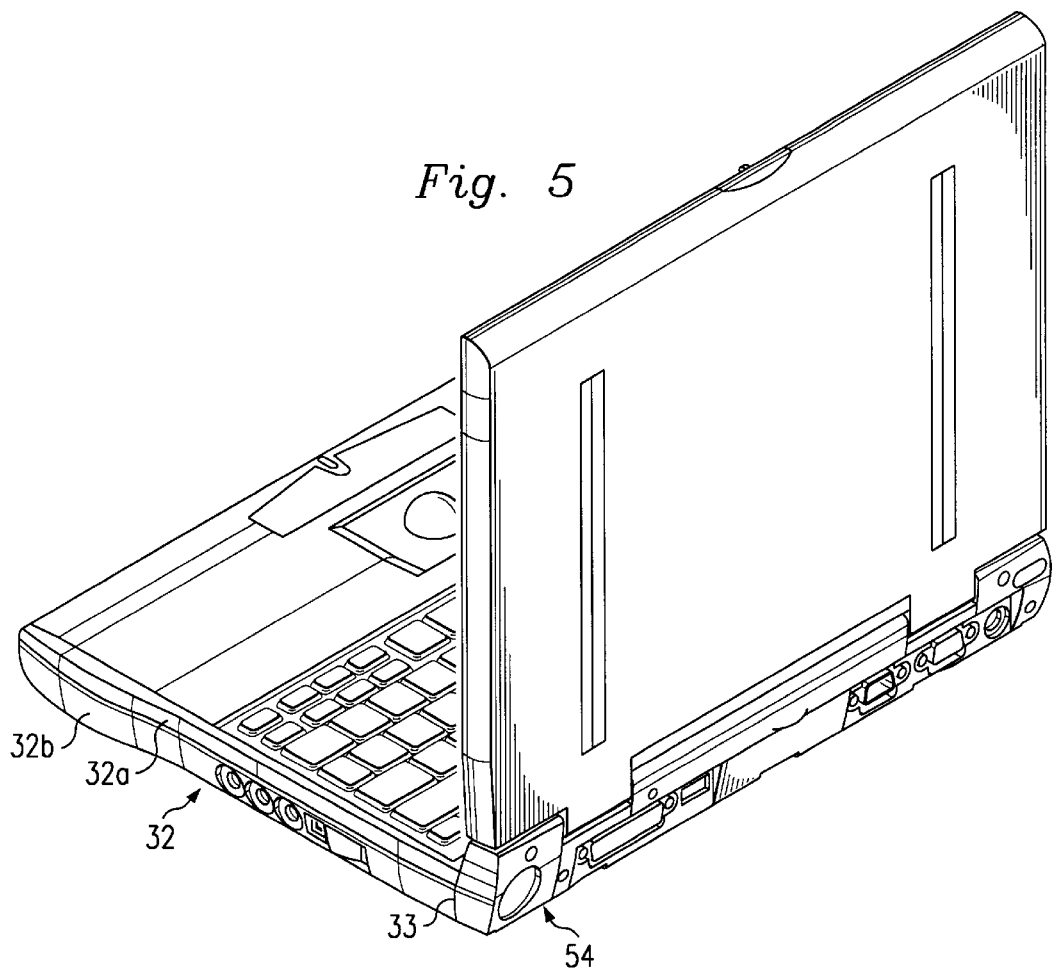
FIG. 5 is an isometric view illustrating an embodiment of a notebook computer with the keyboard installed.
Figure 6:
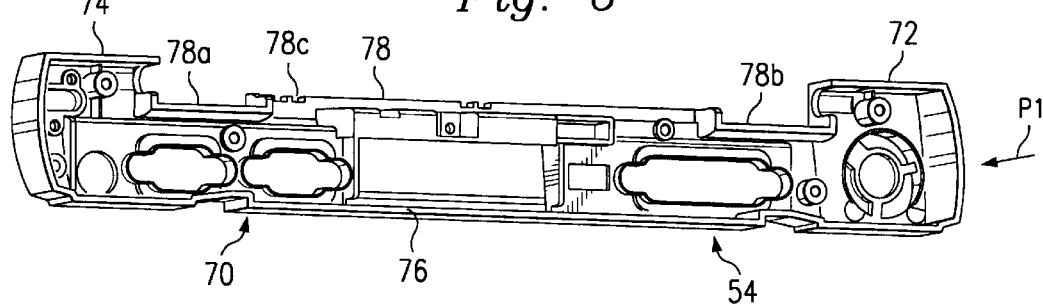
FIG. 6 is an isometric view illustrating an embodiment of the end cover.

In FIG. 5, end cover member 54 is mounted on rear surface 33 of base 32 including first member 32a and second member 32b. End cover member 54, FIG. 6, includes peripheral edge portion 70 which has a first U-shaped cover end flange 72 at a first end thereof and a second U-shaped cover end flange 74 at a second end thereof, opposite the first end. The cover end flanges 72, 74 are interconnected by a first flange span 76 and a second flange span 78. The first and second flange spans 76, 78 are spaced apart from each other and are substantially parallel to each other. The second flange span 78 includes hinge recesses 78a, 78b formed therein. When end cover member 54 is mounted on base 32, FIG. 5, flange span 76 engages first member 32a, FIG. 4, and flange span 78 engages second member 32b, FIG. 2. Flange span 78 also includes protruding tabs 78c, FIG. 6, for engaging second member 32b.

First member 32a of base 32, FIG. 7, includes a flange 80 on opposite ends thereof. Similarly, second member 32b of base 32, includes a flange 84 on opposite ends thereof. It can be seen in FIGS. 2, 6 and 7 that flanges 80, 84 mate to form a combined base end flange which matingly engages U-shaped cover end flanges 72, 74. Added strength is built into each end cover member 54 due to the wrap-around structure of the U-shaped end cover flanges 72, 74, FIG. 6 in a first plane extending in the direction of an arrow designated P1, and the wrap-around structure of a C-shaped section, FIG. 8, viewed in a plane perpendicular to plane P1 through cover member 54. An end wall 90 is attached to peripheral edge portion 70 and extends substantially perpendicular thereto. The I/O ports mentioned above are formed in end wall 90, see FIG. 4.

In operation, the base is assembled by attaching the first member to the second member so that the components and keyboard are appropriately housed and enclosed. The one-piece end cover member is then attached to a rear of the base so that peripheral edge portions of the cover member are engaged with peripheral edge portions of the first and second members for clamping and reinforcing the first and second members together.

As it can be seen, the principal advantages of these embodiments include design benefits. For example, a second accent color may be provided for the end cover member. Cosmetically, the rear input-output area of the housing is improved. The end cover member also allows for complex curved geometries to be incorporated into the design without requiring complex injection mold tooling.

There are service and manufacturing benefits. Ease of assembly for the motherboard is provided. The motherboard subassembly can be installed into the base housing without a traditional rear wall because the end over member is added later to cover the input-output components. This also allows service access to the LCD assembly hinges so that the LCD assembly can be removed without having to remove the top half of the clam shell housing. Also, service access to the rear cooling fan is provided without having to remove significant numbers of parts. Further, because the end cover member is a separate part, it can be easily replaced if damaged, without a major disassembly of the housing.

There are unique advantages provided by the mechanical construction architecture. The end cover member provides a stiff structural member to close off and complete the rear of the housing assembly. The "C" cross-section of the end cover member provides more structural rigidity than typical bases formed only by a top and a bottom of the clam shell. The end cover member accepts several screws which enhance the structural rigidity in the rear of the notebook housing where the LCD hinge stresses are typically high. The LCD hinge members can be securely tied to the motherboard subassembly and the rear cover subsequently added, with additional screws, to provide additional multi-axis support. The end cover also provides a separate part which is used to house and secure input-output cover doors, an IR lens and the cooling fan grill.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A portable computer housing comprising:

a base including a first member and a second member; and a one-piece end cover member having a peripheral edge portion engaged with peripheral edge portions of the first member and second member for clamping and reinforcing the first and second members together, the end cover member including a plurality of input-output ports.

2. The portable computer housing as defined in claim 1 wherein the first member includes a first flange on opposite ends thereof and the second member includes a second flange on opposite ends thereof, the first and second flanges forming base end flanges when the first and second members are mated together, the one-piece end cover member having a cover end flange at opposite ends thereof, each cover end flange overlappingly engaging the base end flanges at each opposite end of the base member.

3. The portable computer housing as defined in claim 2 wherein the cover end flanges are U-shaped.

4. The portable computer housing as defined in claim 2 wherein the cover end flanges are interconnected by substantially parallel spaced apart flange spans.

5. The portable computer housing as defined in claim 4 wherein one of the flange spans includes hinge recesses formed therein.

6. The portable computer housing as defined in claim 5 wherein one of the flange spans engages the first member and another of the flange spans engages the second member.

7. The portable computer housing as defined in claim 5 wherein one of the flange spans includes protruding tabs for engaging one of the first and second members.

8. A computer system comprising:

a microprocessor;

an input coupled to provide input to the microprocessor;

a mass storage coupled to the microprocessor;

a display coupled to the microprocessor by a video controller;

a memory coupled to provide storage to facilitate execution of computer programs by the microprocessor;

a computer housing for portably containing the microprocessor, the input, the mass storage, the display and the memory, the housing including a base having a first member and a second member; and a one-piece end cover member having a peripheral edge portion engaged with peripheral edge portions of the first member and second member for clamping and reinforcing the first and second members together, the end cover member including a plurality of input-output ports.

9. The system as defined in claim 8 wherein the first member includes a first flange on opposite ends thereof and the second member includes a second flange on opposite ends thereof, the first and second flanges forming base end flanges when the first and second members are mated together, the one-piece end cover member having a cover end flange at opposite ends thereof, each cover end flange overlappingly engaging the base end flanges at each opposite end of the base member.

10. The system as defined in claim 9 wherein the cover end flanges are U-shaped.

11. The system as defined in claim 9 wherein the cover end flanges are interconnected by substantially parallel spaced apart flange spans.

12. The system as defined in claim 11 wherein one of the flange spans includes a hinge recess formed therein.

13. The system as defined in claim 12 wherein one of the flange spans engages the first member and another of the flange spans engages the second member.

14. The system as defined in claim 12 wherein one of the flange spans includes protruding tabs for engaging one of the first and second members.

15. An end cover for a portable computer base comprising:

a one-piece end cover member having peripheral edge portions including a cover end flange at opposite ends thereof, the cover end flanges being interconnected by substantially parallel spaced apart flange spans; and the end cover member including input-output ports formed therein.

16. The end cover as defined in claim 15 wherein the cover end flanges are U-shaped in a first direction and C-shaped in a second direction, perpendicular to the first direction.

17. The end cover as defined in claim 16 wherein one of the flange spans includes hinge recesses formed therein.

18. The end cover as defined in claim 15 wherein the end cover member includes an end wall attached to the peripheral edge portions and extending substantially perpendicular thereto.

19. The end cover as defined in claim 18 wherein the input-output ports are formed in the end wall.

20. A method of forming a portable computer base comprising the steps of:

assembling a base including a first member and a second member;

attaching a one-piece end cover member to the base; and engaging peripheral edge portions of the cover member with peripheral edge portions of the first and second members for clamping and reinforcing the first and second members together.

* * * * *